United States Patent Office 3,406,115
Patented Oct. 15, 1968

3,406,115
METHOD OF LESSENING FRICTION IN MOVING OIL-BASE LIQUIDS
Jerry L. White, Tulsa, Okla., assignor to The Dow Chemical Company, Midland, Mich., a corporation of Delaware
No Drawing. Filed Apr. 2, 1965, Ser. No. 445,247
9 Claims. (Cl. 252—8.5)

ABSTRACT OF THE DISCLOSURE

An oil-base liquid, prior to its being moved or while it is being moved along a conduit, is admixed with an aluminum salt of a mono-alkyl substituted benzoic acid (i.e., a metal alkylbenzoate). The additive lessens the turbulence of the liquid when in motion and has the added desirable property of lessening the loss of fluid to a porous surface in contact therewith, which property is enhanced in a synergistic manner when used in conjunction with silica flour.

The invention is an improved method of treating an oil-base liquid for purposes of reducing the turbulence therein and thereby lessening friction losses while the liquid is moving through a confined passageway, channel, or conduit, and an improved method of drilling wells in geologic formations employing the composition. An oil-base liquid, as used herein, is one consisting substantially of oil or a water-in-oil emulsion.

When an oil-base liquid, characteristic of non-Newtonian liquids, generally, is forced or in any way moved along a directed course, as in a confining or restricting structure, it undergoes loss of energy due to friction, both among the molecules, micelles, or globules of oil and between the oil and the walls of the confining structure. It has been found that the flow of an oil-base liquid is facilitated and is accompanied by a lessening of energy loss if the flow characteristics can be made to approach laminar flow, which ideally occurs when all portions of the oil-base liquid move forward along substantially parallel lines, at substantially the same rate at any given front, rather than at least partially from side to side or in eddies and at appreciably different rates of forward progress, as exists in turbulent flow.

The loss of energy which results from turbulence of oil-base liquids when being pumped or otherwise caused to flow through vessels, pipes, channels, and the like (hereinafter usually referred to generally as conduits) is almost always appreciable, and, in some instances, very great, necessitating added pumping costs and maintenance expenditures.

It is apparent, therefore, that a reduction in loss of energy, now experienced in the transfer of oil-base liquids through conduits, is a definite need.

The instant invention meets this need. It has the added advantage, when employed in operations, wherein a liquid is brought into contact with porous subterranean formations, of lessening loss of the liquid to the formation.

The invention comprises admixing with an oil-base liquid, prior to its being moved or while it is being moved along a conduit, an aluminum salt of a monoalkyl-substituted benzoic acid (i.e. an aluminum alkylbenzoate) wherein the alkyl group, attached directly to a carbon atom of the benzene nucleus, contains from about 6 to about 20 carbon atoms. The alkyl substituent may be branched or straight chain and may be positioned on any nuclear carbon atom other than the one attached to the carboxylate group. The amount of the additament to employ is between about 1 and about 200 pounds, more commonly between about 2.5 and 100 pounds and preferably between about 25 and about 50 pounds, per 1000 gallons of oil-base liquid.

The invention has especial application to oil-base well-working, well-drilling, and well-treating liquids, and to crude oil to lessen the friction and energy loss experienced when such liquid is moved through conduits, e.g. well casing and tubing, or pipes to storage or use.

As an additional advantage, the composition employed in the invention effectuates a reduced fluid loss to formations with which it comes in contact. It is particularly effective in this regard when used in combination with fine silica (i.e. silica flour), there resulting a synergistic effect not predictable from either component used alone.

This invention is preferably practiced by dissolving the alkyl-substituted aluminum salt of benzoic acid in an aromatic solvent or an aromatic solvent in admixture with a liquid aliphatic hydrocarbon, e.g. kerosene or the like. The aromatic solvent to employ is preferably selected from the class consisting of xylenes, benzene, toluene, ethylbenzene, n-propylbenzene, n-butylbenzene, t-butylbenzene, cumene, p-cymene, diethylbenzene, triethylbenzene, hexaethylbenzene, hemimellitine, pseudocumene, and isodurene. When a mixture of an aliphatic liquid hydrocarbon and an aromatic solvent is employed, it is recommended that there be present at least about 0.5 percent, by volume of total oil, of the aromatic solvent.

The thus dissolved aluminum alkylbenzoate can advantageously be admixed with any oil-base liquid which is in motion or which is to be put in motion as by being conveyed or transported through a conduit, including oil-base drilling fluids, well-working fluids, crude oil to be moved in pipe lines, and the like.

The aluminum salt used in the method of the invention, is one having the formula:

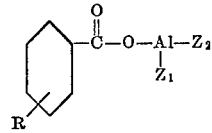

wherein R is a higher alkyl containing from about 6 to about 20 carbon atoms and $Z_1$ and $Z_2$ are independently selected form the class consisting of the

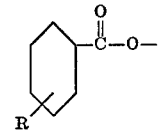

(i.e. another alkylbenzoate group) and OH.

The aluminum alkylbenzoates useful in the practice of the invention may be prepared by one of several procedures including admixing a freshly prepared aqueous solution of sodium or potassium alkylbenzoate with an aqueous solution of an aluminum salt hydrate (e.g. aluminum chloride hydrate or aluminum sulfate hydrate), in a substantially 1:1 mole ratio, to produce a precipitate; filtering off and washing the precipitate with water followed by washing with acetone or ethanol, and drying.

The aluminum salts which are particularly effective in the practice of the invention are the aluminum dodecylbenzoates and particularly aluminum tri(p-dodecybenzoate).

The following procedure illustrates a mode of preparing an aluminum alkylbenzoate wherein an aluminum tri (alkylbenzoate) is prepared.

Procedure A

P-dodecylbenzoic acid is first prepared, e.g. as follows: 60 grams (0.185 mole of p-dodecylbromobenzene are reacted with an excess of magnesium turnings in 200 ml.

of tetrahydrofuran to prepare a Grignard reagent. Upon completion of the reaction, the Grignard reagent is poured into a large excess of solid carbon dioxide. After evolution of excess carbon dioxide, the resultant product is hydrolyzed by acidification with an aqueous solution of hydrogen chloride. When the product so made is separated, dried, and distilled, it yields 28 grams (0.097 mole) of p-dodecylbenzoic acid.

Aluminum tri(p-dodecylbenzoate) is then prepared, e.g. as follows: 20 grams of the p-dodecylbenzoic acid, thus prepared, is slurried with a stoichiometric quantity (1.26 grams) of water which is reactive therewith. A solution of 4.7 grams of aluminum is isopropoxide, dissolved in a suitable organic solvent, e.g. Skelly solvent, is poured into the acid-water slurry which brings about instantaneous thickening of the resulting solution. The resulting thickened solution is heated on a steam bath for about an hour. Thereafter isopropanol (formed during the reaction) and the organic solvent are removed under vacuum conditions, leaving dry white aluminum tri(dodecylbenzoate).

Other aluminum trialkylbenzoates, e.g. wherein the alkyl group is octyl, nonyl, decyl, and undecyl, may be prepared similarly to the above procedure by substituting the appropriate alkyl bromobenzoic acid in the preparation of the alkyl benzoic acid employed.

The following procedure illustrates a second mode of preparing an aluminum alkylbenzoate resulting in an aluminum di(alkylbenzoate).

Procedure B

Di(p-dodecylbenzoic) acid may be prepared by dissolving 20 grams of sodium dodecylbenzoate (0.064 mole) in approximately 400 ml. of slightly acidified water, e.g. water containing 0.2% acetic acid, 0.256 gram of 50 percent NaOH (0.032 mole) is added to this acidic solution, followed by the addition of a solution of 11.32 grams (0.017 mole) of aluminum sulfate hydrate [$Al_2(SO_4)_3 \cdot 18H_2O$] dissolved in 150 ml. of water with continuous stirring during all additions. The aluminum di(p-dodecylbenzoate) salt, which precipitates immediately, is removed from the solution as by filtration, and the filter cake ground to a powder and dried under a vacuum at about 55° C.

Procedure C

Another procedure for the preparation of an aluminum alkylbenzoate wherein aluminum mono(dodecylbenzoate) is prepared, comprises treating trimethyl-aluminum with dodecylbenzoic acid in dry benzene and triturating with a dry low-boiling petroleum ether.

Whether or not the resulting aluminum salt is the mono-, di-, or trialuminum salt is dependent on the weight ratio of aluminum employed to the acid present. For example, in Procedure A above, the aluminum mono(p-dodecylbenzoate) is formed when an amount of aluminum propoxide is employed which provides one-third the molar weight of aluminum contained in 4.7 grams; in Procedure B when an amount of aluminum sulfate hydrate is employed which provides about half the molar weight of aluminum contained in 11.32 grams; in Procedure C above when an amount of trimethylaluminum is employed to provide sufficient aluminum required in the formula

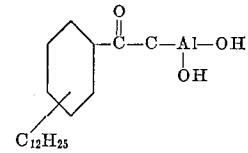

In a similar manner, other alkylbenzoic acids, wherein the alkyl radical thereof contains between about six and twenty carbon atoms, may be employed in place of the p-dodecylbenzoic acid utilized above to prepare an alkyl-substituted aluminum salt having the corresponding alkyl group.

Although any aluminum alkylbenzoate (wherein the alkyl group is $C_6$ to $C_{20}$) is useful in the practice of the invention, the aluminum alkyl benzoates, wherein the alkyl group is octyl, nonyl, decyl, undecyl, or dodecyl, are superior to the others in performance.

The practice of the invention is illustrated by the following examples:

Series One

This series of runs was made to show the effect of the presence of the aluminum alkylbenzoate on plastic viscosity, yield point, and gel strength of kerosene-xylene mixtures to indicate the suitability of the method of the invention for well drilling, employing oil-base drilling fluids. During well-drilling operations, a drilling fluid is circulated down a string of drilling tubing, out through openings in the drill bit secured to the lower end, and upwardly through the annular space surrounding the string of drilling tubing.

For use in this series of runs aluminum tri(dodecylbenzoate) was prepared as described in Procedure A above. The product so made was then admixed in varying amounts, per thousand gallons of kerosene-xylene mixtures (containing some meta-, ortho-, and para-xylenes) in varying ratios. The amount of aluminum tri(dodecylbenzoate), the volume ratio of kerosene to the xylene, and the test results obtained are set out in Table I below, designated examples by numbers. One run, made for comparative purposes is designated by the letter A. The tests were conducted according to the procedures set out in A.P.I. RP 39.

TABLE I

| Test Run Identification | ADDB [1] in lb./1,000 gal. of oil | Percent Xylene by Volume; Balance Kerosene | Plastic Viscosity in cps. | Yield Point in lb./100 ft.[2] | Gel Strength in lb./100 ft.[2] after— | |
|---|---|---|---|---|---|---|
| | | | | | 1 Minute | 10 Minutes |
| A | 0 | 0 | 2 | 0 | None | None |
| 1 | 25 | 20 | 6.6 | 7.4 | 3.2 | 7.4 |
| 2 | 25 | 10 | 8 | 8.4 | 4 | 10.8 |
| 3 | 25 | 5 | 8.6 | 13.4 | 5.8 | 12.6 |
| 4 | 50 | 30 | 8 | 25 | 9 | 22 |
| 5 | 50 | 20 | 14.5 | 52 | 34 | 68 |
| 6 | 50 | 10 | 15 | 85 | 70 | 90 |
| 7 | 25 | 10 | 8.0 | 10.2 | 5.6 | 14.0 |
| 8 | 50 | 10 | 15.0 | 85.0 | 70.0 | 90.0 |
| 9 | 25 | 20 | 6.6 | 7.4 | 3.2 | 7.4 |
| 10 | 50 | 20 | 14.5 | 52.0 | 34.0 | 68.0 |
| 11 | 100 | 20 | 47 | 173.0 | 93.0 | 115.0 |

[1] Aluminum tri(p-dodecylbenzoate).

Reference to Table I shows the definite improvement in plastic viscosity, yield point and gel strength effectuated by the practice of the invention. The improved properties shown in the table are highly desirable in oil-base liquids being moved in a conduit and particularly in drilling fluids.

Series Two

Example 12 was run similarly to the examples shown in Table I except that aluminum mono(p-dodecylbenzoate) was admixed with straight kerosene (containing no aromatic oil) in a proportion of 50 pounds of the aluminium mono(p-dodecylbenzoate) per 1000 gallons of kerosene.

The mixture was heated to 150° C. and gelled in about 15 minutes. Gelation may be satisfactorily carried out at room temperatures employing the same components but requires a longer time. Mixtures of xylene and kerosene and straight xylene were also gelled by admixing therewith aluminum (p-dodecylbenzoate) in the proportion of 50 pounds thereof per 1000 gallons of the oil.

Series Three

The runs in this series were made to show the adaptability of the method of the invention to oils being moved through a tubular type conduit. The same compound and test procedure as was employed in series one was employed in this series. Varying concentrations of the additament in varying ratios of kerosene and xylenes were prepared. The concentration of the additament per volume of kerosene and xylene mixtures and percent reduction in pressure drop are shown in Table II below.

TABLE II

| Test No. | ADDB[1] in lb./1,000 gal. of oil | Percent Xylene by Volume, Balance Kerosene | Percent Reduction[2] in Pressure Drop |
|---|---|---|---|
| B | 0 | 0 | 0 |
| 13 | 2.5 | 0.67 | [3]22 |
| 14 | 25.0 | 6.7 | 55 |
| 15 | 50.0 | 12.5 | 59 |

[1] Has same meaning as in Table I.
[2] May also be defined as percent decrease in resistance to flow, i.e. the force necessary to maintain flow in Test B is considered 100%, in Test 13 it was only 78% of that of Test B. Values for the other examples have similar significance.
[3] The low turbulence material produced in Example 13 employing only 25 pounds per 1,000 gallons was subjected to 10 minutes of high shearing action and was found to be unaffected thereby.

Reference to Table II shows the very marked improvement in lessening the pressure drop (which is a definite indication of less resistance to flow) attained by the practice of the invention.

Series Four

This series of runs was made to show the desirable concomitant effect that the presence of an aluminum dodecylbenzoate in an oil-base liquid has upon fluid loss of the liquid when in contact with porous materials, e.g., subterranean formations being treated during oil well treatments of the nature of fracturing and the like. The same compound as was employed in the series above was prepared. Various concentrations thereof were admixed with varying ratios of kerosene and xylenes. The fluid loss of the so treated oils, with and without the benefit of silica flour, was ascertained, according to the procedure of A.P.I. RP 39, and the results set out in Table III. Run, designated C, was run for comparative purposes.

TABLE III

| Test No. | ADDB[1] Conc., lbs./1,000 gal. | Percent Xylene by Volume in Kerosene | 30 Min. Fluid Loss (ml.) ADDB only | 30 Min. Fluid Loss (ml.) ADDB and Silica Flour[2] |
|---|---|---|---|---|
| C | 0 | 0 | 600 ml. in 1. min. | |
| 16 | 5 | 10 | 52 | 33 |
| 17 | 10 | 10 | 25 | 24.2 |
| 18 | 25 | 10 | 39 | 7 |
| 19 | 50 | 10 | 11 | 5.7 |
| 20 | 5 | 20 | 50 | 26 |
| 21 | 10 | 20 | 50 | 14 |
| 22 | 25 | 20 | 48 | 7.4 |
| 23 | 50 | 20 | 14 | 6.8 |
| 24 | 100 | 20 | 6.6 | 5.2 |

[1] Aluminum tri(p-dodecylbenzoate).
[2] 25 pounds of silica flour were admixed per 1,000 gallons of the kerosene xylene mixture.

Reference to Table III shows conclusively that the aluminum alkylbenzoate employed, in addition to imparting lowered turbulence, also lessens fluid loss to a subterranean formation being treated.

When silica flour was used as the sole fluid loss additive in the oil, the results were unsatisfactory. However, as shown in Table III, a synergistic effect is obtained by the use of both the aluminum alkylbenzoate and silica flour. The amount of silica flour employed may be varied from between about 1 pound to about 250 pounds per 1000 gallons of the oil-base liquid. The particle size of the silica flour should be such that substantially all of it will pass through a 100 mesh sieve.

Series Five

This series of runs was made to show the stability and efficacy of the method of the invention when used with oil-base liquids containing contaminants in the nature of various salts or water. In carrying out this series of runs, 50 pounds of aluminum tri(dodecylbenzoate) were dissolved per 1000 gallons of a 12% xylene-88% kerosene by volume mixture, and the effect upon the viscosity, if any, observed. The type and amounts of contaminant employed and the results are set out in Table IV.

TABLE IV

| Test No. | Additive | Concentration, percent by Wt. | Effect on Viscosity |
|---|---|---|---|
| 25 | Water | 2 | None. |
| 26 | 15% Sodium Chloride | 2 | Do. |
| 27 | Saturated Sodium Chloride | 2 | Do. |
| 28 | 40% Calcium Chloride | 2 | Do. |
| 29 | Calcium Sulphate | 1 | Do. |
| 30 | Barium Sulphate | 1 | Do. |

Reference to Table IV shows that the presence of the salts and water in the amounts used, had no observed effect upon the resulting low turbulence mixture. However, by additional tests conducted wherein a strong acid, e.g., HCl, or strong base, e.g., NaOH, was present in an amount in excess of 0.1% by weight thereof it was shown that the beneficial effects of the metal alkylbenzoate were markedly lessened.

Series Six

This series of runs was made to ascertain the effect of the addition of an oil-base liquid, of a metal alkylbenzoate in accordance with the invention, at various temperatures, on viscosity of the liquid. 50 pounds of aluminum tri(p-dodecylbenzoate) per 1000 gallons of a 12% xylene-88% kerosene mixture by volume were prepared and tested and the resulting viscosity observed. The results are set out in Table V.

TABLE V

| Test No. | Temperature, ° F. | Viscosity, cps. |
|---|---|---|
| 31 | 80 | 97 |
| 32 | 100 | 92 |
| 33 | 120 | 83 |
| 34 | 150 | 75 |

Reference to Table V shows that the viscosity is somewhat reduced by increased temperature. However, it is clear that at temperatures commonly existing in oil-base liquids under motion in industrial operations including well drilling, treating, and producing therefrom, has no objectionable effect on the composition of the invention.

Example 35

As illustrative of the practice of the invention, an aluminum alkylbenzoate is admixed with an oil-base drilling fluid in an amount sufficient to provide between 1 and about 200 pounds, and preferably between about 25 and about 50 pounds, of the metal alkylbenzoate per 1000 gallons of the drilling fluid and the resulting drilling fluid employed according to a known mode of operation. Loss of energy during movement through the lines and loss of fluid to the formation are both lessened thereby.

Example 36

As further illustrative of the practice of the invention, an aluminum alkylbenzoate is admixed with an oil-base fracturing fluid and injected down a well penetrating a formation and back into the formation at sufficient pressure to fracture the formation. Loss of energy during movement through the line and loss of fluid to the formation are both lessened thereby.

Example 37

Another example of the invention is to admix an aluminum alkylbenzoate with an oil-base liquid being moved along or about to be moved along a conduit thereby to lessen the loss of energy due to turbulence during movement. The amount of the composition added may be between 1 and about 100 pounds thereof per 1000 gallons of the oil-base liquid.

In each of the embodiments illustrated by Examples 35, 36, and 37 above, turbulence of the liquid is appreciably decreased, resistance to flow correspondingly decreased and consequently energy necessary to maintain a given rate of flow decreased and/or the rate of flow increased without additional expenditure of energy.

In successive trials, a number of the examples of Series One was repeated except that instead of employing an aluminum dodecylbenzoate the following were employed in separate runs: barium(p-dodecylbenzoate), sodium(p-dodecylbenzoate), and triphenyl bis(p-vinylbenzoate). In none of these trials was a satisfactory gel obtained to lessen, satisfactorily, the turbulence of oil-base liquids in motion through a conduit.

When an aluminum alkylbenzoate other than the dodecylbenzoate, within the scope of the invention, is employed, comparable results are obtained. Other satisfactory aluminum alkylbenzoates to employ in the invention include those wherein the alkyl group is octyl, nonyl, decyl, hendecyl, tridecyl, tetradecyl, pentadecyl, hexadecyl, heptadecyl, octadecyl, nonadecyl, or eicosyl.

Having described my invention, what I claim and desire to protect by Letters Patent is:

1. In the method of drilling a well employing an oil-base drilling fluid, wherein lessened turbulence to flow and reduced fluid loss to the formation are desired, the improvement comprising admixing with the drilling fluid between about 0.5 and about 200 pounds, per 1000 gallons of the drilling fluid employed, of an aluminum benzoate selected from the group consisting of monovalent, divalent, and trivalent aluminum alkylbenzoates wherein each alkyl contains between 6 and 20 carbon atoms and circulating the thus treated oil-base drilling fluid down a string of drilling tubing, through openings in the drilling bit secured at the lower end thereof, and upwardly through the annular space surrounding the string of drilling tubing.

2. The method according to claim 1 wherein the aluminum alkylbenzoate is first admixed with a liquid hydrocarbon consisting of at least 0.5 percent by volume of an aromatic hydrocarbon liquid and balance an aliphatic hydrocarbon liquid.

3. The method according to claim 1 wherein the aluminum is trivalent aluminum.

4. The method according to claim 1 wherein the alkyl is dodecyl.

5. In the method of fracturing a formation penetrated by a well employing an oil-base fracturing liquid, wherein lessened turbulence of flow and reduced fluid loss to the formation are desired, the improvement comprising admixing, per 1000 gallons of said fracturing liquid, between about 0.5 and about 200 pounds of an aluminum alkylbenzoate selected from the group consisting of monovalent, divalent, and trivalent aluminum alkylbenzoates wherein each alkyl group contains between 6 and 20 carbon atoms and injecting the so treated fracturing liquid down the well and back into the formation at fracturing pressures to fracture the formation.

6. The method according to claim 5 wherein the aluminum alkylbenzoate is first admixed with a liquid hydrocarbon consisting of at least 0.5 percent by volume of an aromatic hydrocarbon liquid and balance an aliphatic hydrocarbon liquid.

7. The method according to claim 5 wherein the metal is trivalent aluminum.

8. The method according to claim 5 wherein the alkyl is dodecyl.

9. The method according to claim 5 wherein between 1 and 250 pounds of finely particulated silica having a particle size that will substantially pass through a 100 mesh sieve, per 1000 gallons of the oil-base liquid, is admixed therewith to provide a synergistic effect with the aluminum alkylbenzoate on fluid loss of the liquid to said formation.

References Cited

UNITED STATES PATENTS

| | | | |
|---|---|---|---|
| 2,492,173 | 12/1949 | Mysels | 137—13 |
| 2,599,553 | 6/1952 | Hotten | 252—37.7 |
| 2,764,546 | 9/1956 | Engle | 252—8.5 |
| 2,768,138 | 10/1956 | Hotten et al. | 252—37.7 |
| 2,851,417 | 9/1958 | Andress | 252—37.7 X |
| 3,102,548 | 9/1963 | Smith et al. | 137—13 |
| 3,105,047 | 9/1963 | Miller et al. | 252—8.55 |
| 3,168,475 | 2/1965 | Jordan et al. | 252—8.55 |
| 3,215,154 | 11/1965 | White et al. | 166—42 |
| 3,254,719 | 6/1966 | Root | 166—42 |

CHARLES E. O'CONNELL, *Primary Examiner.*

I. A. CALVERT, *Assistant Examiner.*